United States Patent
Topfer

(10) Patent No.: US 7,824,250 B2
(45) Date of Patent: Nov. 2, 2010

(54) MAGAZINE FOR STORAGE RODS FOR RECEIVING SAUSAGE-SHAPED PRODUCTS AND METHOD FOR SUPPLYING THE STORAGE RODS FOR LOADING WITH SAUSAGE-SHAPED PRODUCTS

(75) Inventor: Klaus Topfer, Büttelborn (DE)

(73) Assignee: Poly-Clip System GmbH & Co., Frankfurt/Main (DE)

( * ) Notice: Subject to any disclaimer, the term of this patent is extended or adjusted under 35 U.S.C. 154(b) by 113 days.

(21) Appl. No.: 12/197,016

(22) Filed: Aug. 22, 2008

(65) Prior Publication Data
US 2009/0053985 A1   Feb. 26, 2009

(30) Foreign Application Priority Data
Aug. 23, 2007   (DE) .................. 10 2007 039 883

(51) Int. Cl.
*A22C 11/00* (2006.01)
(52) U.S. Cl. ........................................... 452/51
(58) Field of Classification Search ............. 452/21–26, 452/30–35, 37, 46–48, 51
See application file for complete search history.

(56) References Cited

U.S. PATENT DOCUMENTS

| | | | |
|---|---|---|---|
| 4,119,243 A | | 10/1978 | Marecek et al. |
| 4,434,527 A | * | 3/1984 | Staudenrausch et al. ...... 452/34 |
| 4,673,103 A | | 6/1987 | Anderson et al. |
| 5,082,419 A | * | 1/1992 | Kollross et al. ............. 414/800 |
| 5,238,353 A | * | 8/1993 | Kollross et al. ........... 414/746.4 |
| 7,121,940 B2 | * | 10/2006 | Haschke et al. ............... 452/51 |
| 7,255,638 B2 | * | 8/2007 | Stimpfl ........................ 452/32 |

FOREIGN PATENT DOCUMENTS

| | | |
|---|---|---|
| DE | 519628 | 3/1931 |
| DE | 863586 | 1/1953 |
| DE | 19621834 A1 | 12/1997 |
| GB | 1367059 | 9/1974 |
| JP | 5058457 A | 3/1993 |

OTHER PUBLICATIONS

EP 07 01 7500 Search Report.

* cited by examiner

*Primary Examiner*—Thomas Price
(74) *Attorney, Agent, or Firm*—Louis F. Wagner; Hahn Loeser & Parks LLP

(57) ABSTRACT

A magazine for storage rods for receiving sausage-shaped products, comprising one or a plurality of vertically extending shafts 2 in which the storage rods 3 are to be arranged one above the other, wherein a separation means is provided at the bottom end of the respective shafts 2, said separation means having retention devices 4, 5 which can be moved into the interior of the shaft for successive operating positions for releasing the bottommost storage rods 7.

27 Claims, 4 Drawing Sheets

MAGAZINE FOR STORAGE RODS FOR RECEIVING SAUSAGE-SHAPED PRODUCTS AND METHOD FOR SUPPLYING THE STORAGE RODS FOR LOADING WITH SAUSAGE-SHAPED PRODUCTS

BACKGROUND OF THE INVENTION

The invention relates to a magazine for storage rods for receiving sausage-shaped products, according to the preamble of claim 1, and a method for supplying the storage rods for loading with sausage-shaped products, according to the preamble of claim 21.

SUMMARY OF THE INVENTION

The storage rods are adapted to receive sausage-shaped products, wherein the sausage-shaped products have suspension elements, particularly suspension loops, which can be threaded into the storage rods. By this means, the sausage-shaped products can be suspended adjacent to one other on the storage rods, for example for smoking. In practice, the sausage-shaped products are supplied in rapid succession from a production machine and suspended on the storage rods. To ensure that successive storage rods are loaded with the sausage products in a smooth operating sequence, it is necessary that the storage rods are likewise conveyed in rapid succession to the loading device.

The object of the invention is thus to provide a magazine and a method of the kind initially specified, with which the storage rods can be supplied in a rapid and orderly manner for subsequent loading.

This object is achieved according to the invention by a magazine having the features of claim 1 and with a method having the features of claim 21.

The invention accordingly provides a magazine for storage rods that are to be loaded with sausage-shaped products, said magazine comprising one or a plurality of vertically extending shafts. In the one shaft or plurality of shafts, storage rods are arranged one above the other. By this means, the plurality of storage rods can be provided in presorted form. At the lower end of each shaft, a separation means is provided which releases the bottommost storage rod so that the latter can proceed or be conveyed into the loading device. The width of the shafts is adapted to the respective rod width so that unimpeded successive downward movement of the storage rods due to the force of gravity is achieved when the respective storage rod is downwardly released.

To ensure that the storage rods lying one on top of the other are released in an orderly manner from the respective shafts, each separation means is provided, at least at one of the two end faces of the shaft, with two retention devices which are arranged one above the other and can be moved into the interior of the shaft for successive operating positions. In a first operating position, the two retention devices, i.e. the upper retention device and the lower retention device, project into the interior of the shaft. The bottommost storage rod then rests on the upper retention device. In a second operating position, the upper retention device is removed from the interior of the shaft and the bottommost storage rod moves downwards, in particular by the force of its weight, and rests on the lower retention device. In a third operating position, both the upper retention device and the lower retention device are moved into the interior of the shaft. The bottommost storage rod then lies between the two retention devices projecting into the interior of the shaft and rests on the lower retention device. The upper retention device projects into a cavity or into cavities between the bottommost storage rod and the storage rod thereabove. In a fourth operating position, the lower retention device is removed from the interior of the shaft to release the bottommost storage rod. Preferably guided by a conveying means, the released storage rod then moves into the loading device in which the sausage products are suspended one after the other on the storage rod.

The storage rods may be introduced into the loading device immediately after their release from the respective magazine shaft. Preferably, however, a conveying means on which the released storage rods are arranged in consecutive order in the direction of transportation is provided under the shaft openings through which the released storage rods move downwards. To this end, the conveying means can have loading points, e.g. compartments, into each of which a storage rod is transferred on release. However, it is also possible for storage rods lying adjacent to one another in the conveying device to be moved in the direction of the loading device by a pushing device.

It is preferable that storage rods having a uniform cross-sectional shape are used. For example, the storage rods can have a square cross-sectional shape, preferably with rounded corners. The cross-sectional shape of the storage rods can also be star-shaped, in particular Y-shaped with equally long profile limbs and equal angular distances between the profile limbs. Storage rods of circular cross-section are also suitable. Such uniformly configured storage rods can be fed as bulk material, for example via a slantingly inclined area for bulk material, to the top of the magazine shafts, the storage rods arranging themselves automatically in the shafts due to their uniform cross-section, in such a way that they can move successively by force of gravity and without impediment while the bottommost storage rod is being released.

With the aid of the magazine described above and of the conveying device described above, the invention also provides a method for supplying storage rods that are to be loaded with sausage-shaped products, in which the storage rods are moved from a standby position in which the storage rods are individually arranged one above the other in a plurality of vertical rod arrangements adjacent to one another in the direction of transportation, for subsequent loading with the sausage-shaped products. As described above, the vertical rod arrangements are provided in the shafts arranged adjacent to one another. The respective bottommost storage rods are released individually and substantially simultaneously from the rod arrangements and the released, adjacently arranged storage rods are transported to the loading device simultaneously, i.e. in batches, by means of the conveying means. For synchronised release of the respective bottommost storage rods, the starting position of the empty conveying means under the vertical rod arrangements or shafts is detected, whereupon the bottommost storage rods are released into the conveying means. The starting position can be scanned with the aid of a sensor device, in particular in a contactless manner, for example optically, capacitively, inductively or like manner. When the released storage rods are being transported in the direction of the loading device, they may be spaced apart from each other or be lying adjacent each other. It is detected when each batch of storage rods being transported has exited the region under the vertical rod arrangements remaining in the shafts. When the conveying means is next detected in the starting position, this is a sign that the conveying means, with its loading points, is aligned with the shafts and ready to receive the next batch of storage rods to be released.

BRIEF DESCRIPTION OF THE SEVERAL VIEWS OF THE DRAWINGS

Embodiments of the invention shall now be described in detail with reference to the Figures, in which.

DETAILED DESCRIPTION OF THE INVENTION

The embodiments in FIGS. 1-4 show magazines 1, which have vertically extending shafts 2. Storage rods 3 suitable, for example, for smoking sausage products, are arranged one above the other in the shafts. In the embodiment shows in FIGS. 1 and 2, storage rods 3 have a uniform, star-shaped cross-section with three equally long profile limbs that are spaced the same angular distance from each other. In the embodiment shown in FIG. 3, storage rods 3 have a substantially square cross-section with rounded corners.

Due to these uniform cross-sectional shapes, storage rods 3 arrange themselves in vertical shafts 2 substantially automatically into several possible positions about their longitudinal axis. The width of shafts 2 is adapted to the width of the respective storage rods, so that these can successively move unimpededly when the respective bottommost storage rod is released.

Storage rods 3 can also be fed as bulk material, for example along a slantingly inclined bulk material area 20 at the top end of shafts 2, the storage rods positioning themselves automatically in shafts 2, as already mentioned, due to their uniform shapes.

Figure 1:
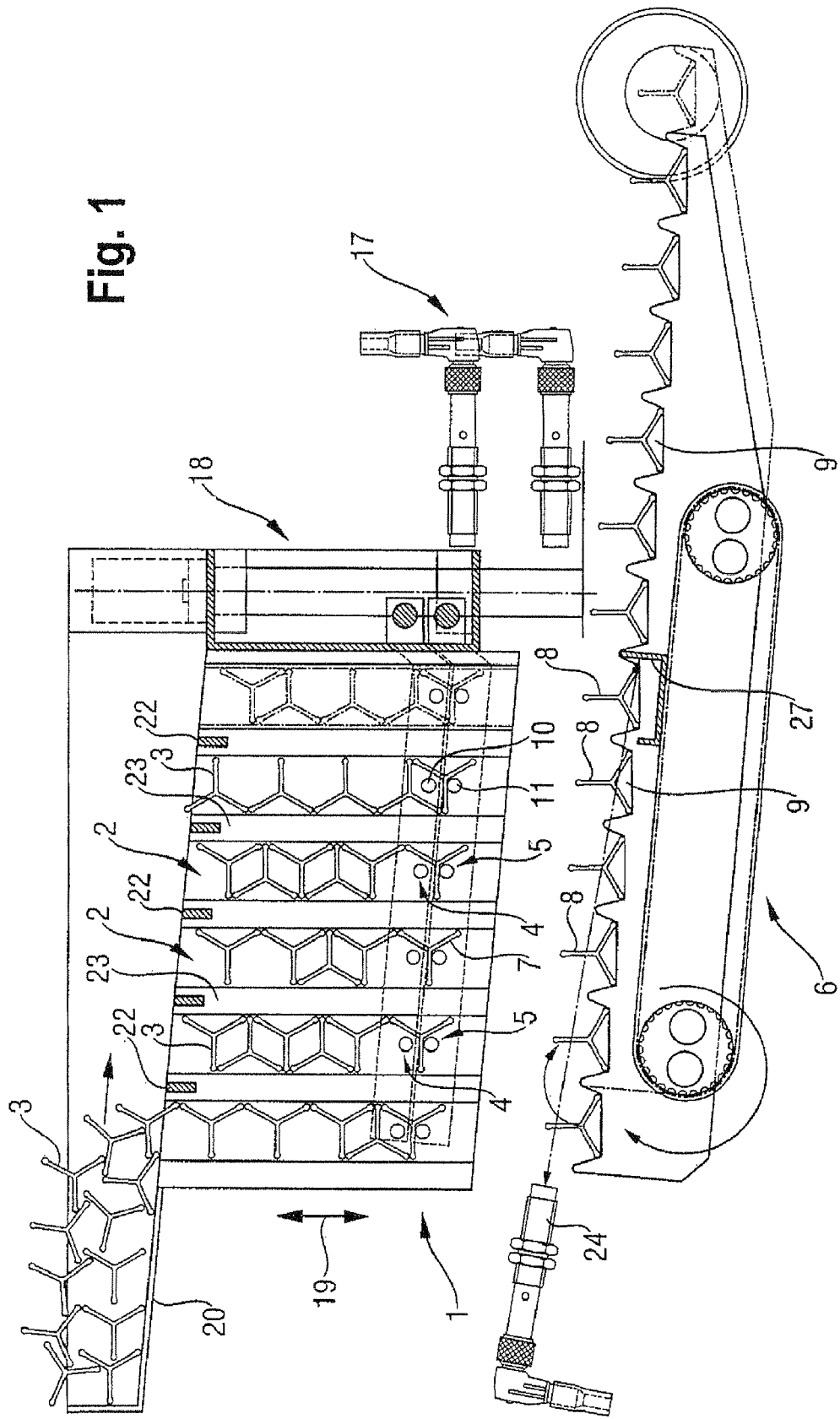
FIG. 1 shows a first embodiment of the invention.
Figure 2:
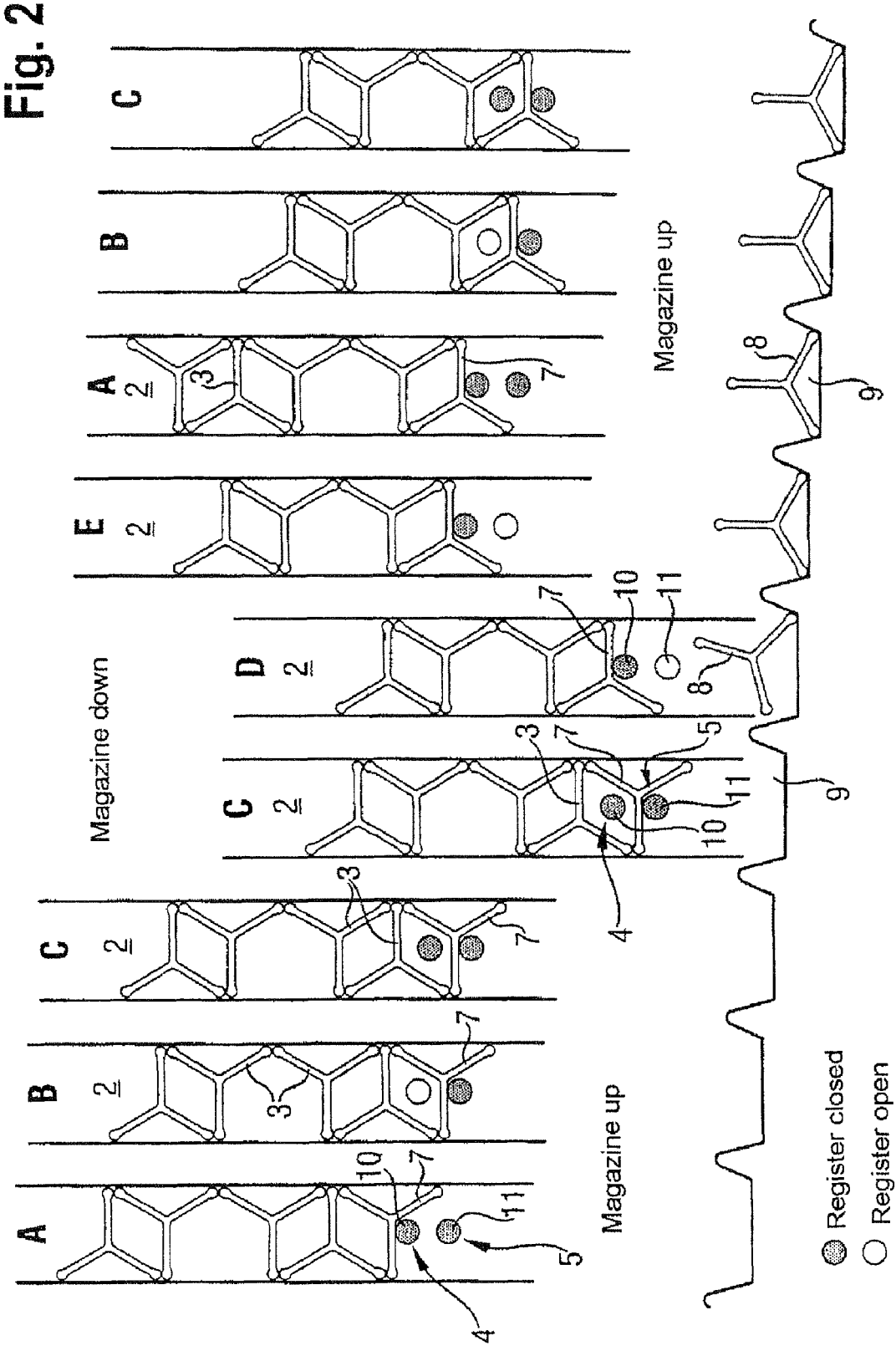
FIG. 2 shows various operating positions of the embodiment shown in FIG. 1.
Figure 3:
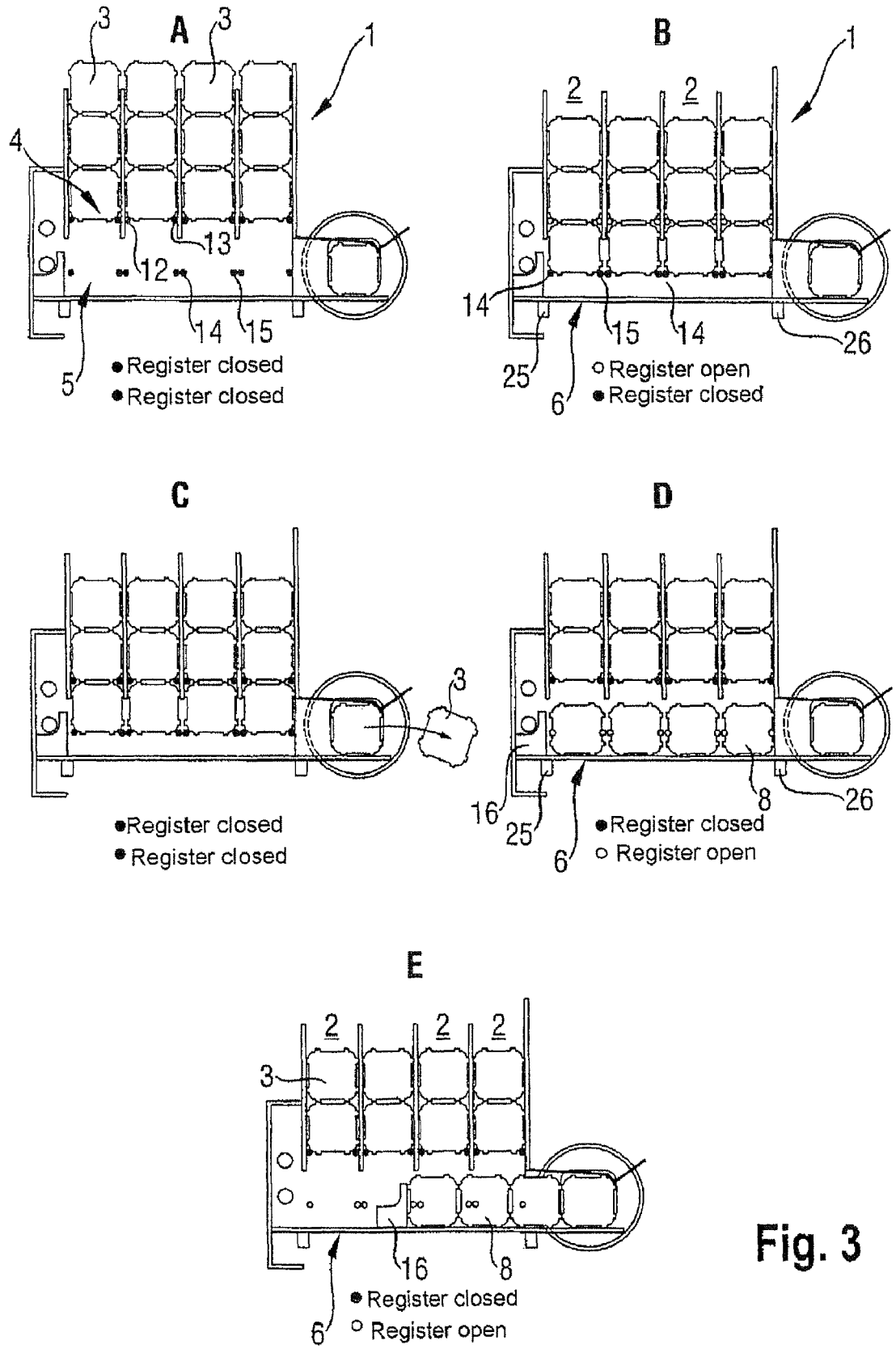
FIG. 3 shows various operating positions of another embodiment of the invention.

The shafts extend perpendicularly to the respective plane of the drawings in FIGS. 1-3 and have end faces 21 running parallel to the plane of the drawing (FIG. 4) and which terminate the shafts in their longitudinal extension.

At the respective lower ends of shafts 2, separation means are provided which bring about the successive individual release of the bottommost storage rod 7.

In the embodiments, each respective separation means has two retention devices 4 and 5 arranged one above the other. In the embodiment shown in FIG. 1, the upper retention device 4 has a retention element 10, for example in the form of a bolt, disposed substantially in the middle of the end face of the respective shaft 2. The lower retention device 5 also has a retention element 11 disposed below it, preferably and likewise in the form of a bolt. Retention elements 10 and 11 can adopt two different positions that are shown in FIG. 2 for the embodiment in FIG. 1. In the position designated "Register closed" in FIG. 2, retention elements 10 and 11 project into the interior of the shaft. In the position designated "Register open" in FIG. 2, retention elements 10 and 11 have been removed from the interior of the shaft. The two positions can be reached by moving the respective retention element 10 and 11 in their longitudinal direction. This movement can be effected with the aid of a control device 17 that controls the retention elements pneumatically, for example.

The embodiment for the upper retention device 4 and the lower retention device 5 shown in FIGS. 1 and 2 is preferably suitable for the storage rods 3 with a uniform star-shaped cross-section, as shown in these Figures. These storage rods have three cross-sectional limbs which are spaced 120° apart from each other and have the same length. Due to the central positioning of retention elements 10 and 11 in the respective end face of the shaft, the respective bottommost storage rod 7 is supported on one profile limb, while the ends of the two other profile limbs rest slidingly against a side wall of shaft 2. The end of the limb which is supported by the retention element 10 or 11 projecting into the interior of the shaft rests slidingly against the other side wall of shaft 2.

In the embodiment shown in FIG. 3, two retention elements are provided for each of the two retention devices 4 and 5. In the embodiment shown in FIG. 3, the upper retention device 4 contains retention elements 12, 13 and the lower retention device 5 contains retention elements 14, 15. The retention elements are preferably arranged closed to the two side walls of shafts 2. These retention elements can likewise be moved into two different positions. In the "Register open" position, retention elements 12, 13 and 14, 15, respectively, are removed from the shaft interior, and in the "Register closed" position they project into the interior of the respective shaft 2, as in the embodiment show in FIGS. 1 and 2. The retention devices 4, 5 are preferably provided at the two end faces of shafts 2.

In the embodiments, retention devices 4 and 5 can adopt different operating positions. In a first operating position, retention elements 10, 11 and 12-15 project into the interior of the respective shaft. The bottommost storage rod 7 rests on retention element 10 or on retention elements 12, 13 of the upper retention device 4. This operating position is shown as "A" in FIGS. 2 and 3.

In a second operating position ("B" in FIG. 2 and FIG. 3), retention element 10 is removed from the interior of the shaft, as are retention elements 12, 13 of the upper retention device 4. The bottommost storage rod 7 rests on retention element 11 or on retention elements 14, 15 of the lower retention device 5.

In the third operating position ("C" in FIGS. 2 and 3), retention elements 10, 11 and 12-15 of the two retention devices 4, 5 have been moved to their closed positions and project into the interior of the respective shaft. The bottommost storage rod 7 rests on retention element 11 or on retention elements 14, 15 of the lower retention device 5. Retention element 10 and retention elements 12, 13 of upper device 4 project into cavities between the lower storage rod and the storage rod thereabove. In the embodiment shown in FIGS. 1 and 2, this cavity is formed between the profile limbs of the star-shaped rod profile, and in the embodiment shown in FIG. 3 by the rounded profile corners of the substantially square rod profile.

In a fourth operating position ("D" in FIGS. 2 and 3), retention element 11 and retention elements 14, 15 of the lower retention device 5 are removed from the interior of the shaft ("Register open"). By this means, the bottommost storage rod 7 is released and falls as a released storage rod 8 into a loading point 9 of a conveying means 6. The next storage rod in the sequence (bottommost storage rod 7) is prevented from exiting downwards by retention element 10, which still projects into the interior of the shaft, and/or by retention elements 12, 13 of upper device 4, which likewise still project into the interior of the shaft.

In another operating position E, the released storage rods 8 arranged on the conveying means 6 are transported in the direction of a loading device (not shown). Retention devices 4 and 5 are then returned to the first operating position ("A" in FIGS. 2 and 3).

As can be seen from FIGS. 1 and 2, the respective shafts 2 can be shifted with the aid of a lifting device 18, shown schematically in FIG. 1, from a normal position (magazine raised in FIG. 2) into a lower position (magazine lowered). The respective shafts 2 are shifted into the lower position (magazine lowered) in the fourth operating position ("D") at least, in which the respective bottommost storage rod is released. As can be seen from FIG. 2, the respective magazine shaft 2 can also be in this lower position in the preceding, third operating position ("C"). This ensures that the released storage rod 8 is transferred in a targeted manner to conveying means 6 and in particular into the respective loading points 9 on the conveying means. When the magazine shafts are raised, the released storage rods 8 can be transported unimpededly in conveying means 6 in the direction of the loading device.

Figure 4:
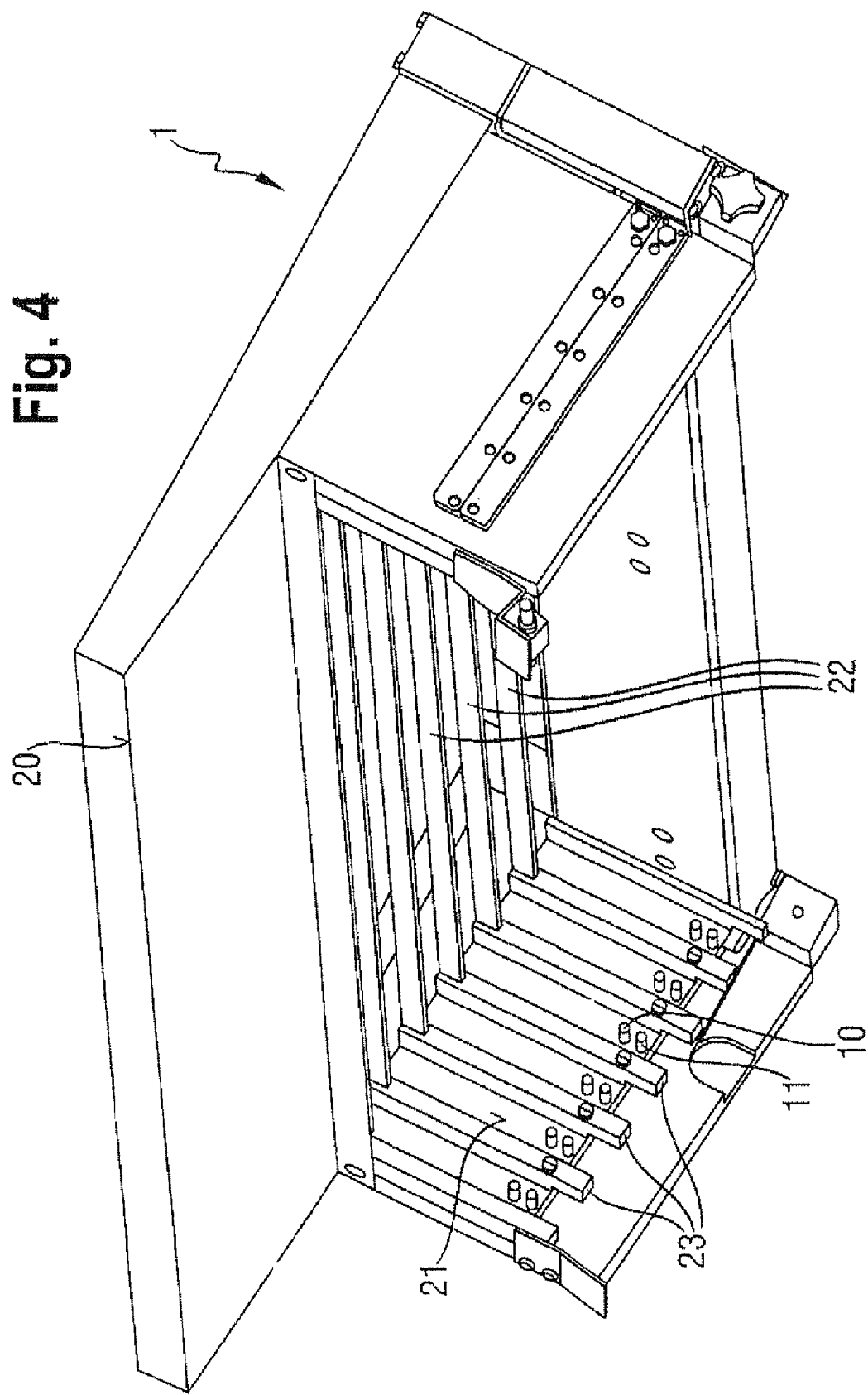
FIG. 4 shows a perspective view of a magazine used in the embodiment according to FIG. 1.

As can be seen from FIGS. 1, 3 and 4, magazine 1 may have several shafts arranged adjacent to one another in the conveying direction. It is also possible, of course, that magazine 1 has only one shaft. As already explained, a lifting movement 19 (FIG. 1) is brought about by lifting device 18. By means of control device 17, retention elements 10, 11 and 12-15 can be moved in a controlled manner both in the raised position and in the lowered position of magazine 1.

In the case of magazines with several shafts 2, as shown in FIGS. 1, 3 and 4, the bottommost storage rods are released simultaneously. In the conveying means 6 shown in FIG. 1, the released storage rods 8 disposed in loading points 9 are transported simultaneously in the direction of the loading device. In the conveying means 6 provided in the embodiment in FIG. 3, the released storage rods 8 are transported simultaneously with the aid of a pushing device 16 over a sliding surface in the direction of the loading device.

FIG. 4 shows an inside view of magazine 1, as viewed at an angle from below. It can be seen from this Figure that magazine 1 has protrusions (ridges) 23 projecting into the interior of the magazine for laterally demarcating the shafts and for arranging the storage rods 3, lying one above the other, in den vertical rod arrangements at the two inner end faces of the magazine. These protrusions extend in the vertical direction at a distance from each other, thus defining the width of the respective shafts 2. The configuration of retention devices 4, 5 corresponds to the embodiment shown in FIG. 1. Of course, the retention devices may also be configured in the same way as in the embodiment shown in FIG. 3.

Bars 22 are provided at the upper shaft ends, said bars extending across the entire length of the magazine and of shafts 2. These bars 22 form shaft boundaries at the upper openings of the shafts, as well as a grid for continuing the adjacent area for bulk material 20. The width of bars 22 is less than the width of the protrusions 23 which define the shafts. Bars 22 are fixed approximately in the middle of the upper ends of protrusions 23. When replenishing shafts 2, the storage rods 3 lying on the bulk material area 20 are moved into the space above the grid in magazine 1 formed by bars 22. By means of bars 22 extending across the entire length of magazine 1, storage rods 2 are individually filled into shafts 2 via the respective cavities between bars 22. This replenishment is preferably carried out depending on and/or in synchrony with the release of the bottommost storage rods into conveying means 6.

The respective starting position in which conveying means 6 is loaded with the released storage rods 8 from shafts 2, and the final position in which the released storage rods 8 leave the region under magazine 1 can be determined with the aid of one or more scanning devices 24 (FIG. 1) or 25, 26 (FIG. 3). These scanning devices can be configured as limit switches or as contactlessly operating scanning devices that detect starting and final positions optically, capacitively or in some other manner.

In the embodiment shown in FIG. 1, scanning device 24 is preferably configured as an optical scanner. A light beam, for example a laser beam, emitted by the scanner is reflected by a reflective area 27 provided on the conveying means and detected by scanning device 24. In this way, and with the aid of a computer-aided evaluation device (not shown) which is connected to scanning device 24, it is detected when conveying means 6 with its loading points 9 is located in the aligned position under shafts 2 of magazine 1. As a result of such detection, control device 17 is actuated by the evaluation device, already described, such that the bottommost storage rod 7 is released for transfer to conveying means 6. The extent to which conveying means 6 is loaded is determined with the aid of scanning device 24, and the released storage rods 8 are transported simultaneously in the direction (to the right in FIG. 1) of the loading station.

In the embodiment shown in FIG. 3, scanning device 25 can determine the starting position of pushing device 16, which is an integral component of conveying means 6 in said embodiment. The final position of pushing device 16 (the position to the far right), in which all the released storage rods have been removed from the region under magazine 1, is determined with the aid of scanning device 26. As soon as pushing device 16 has returned to its starting position, this is likewise determined by scanning device 25. By means of the computer-aided evaluation device connected to scanning devices 25 and 26, the aforesaid is evaluated as the state in which the conveying means is ready to receive new storage rods to be released.

LIST OF REFERENCE SIGNS

1 Magazine
2 Shafts
3 Storage rods
4 Upper retention device
5 Lower retention device
6 Conveying means
7 Bottommost storage rod
8 Released storage rod
9 Loading points
10-15 Retention elements (bolts)
16 Pushing device
17 Control device
18 Lifting device
19 Lifting movement
20 Area for bulk material
21 End faces
22 Bars
23 Protrusions
24 Scanning device
25, 26 Scanning devices

The invention claimed is:

1. A magazine for storage rods for receiving sausage-shaped products, comprising one or a plurality of vertically extending shafts in which the storage rods are to be arranged one above the other, and a separation means at the bottom end of each respective shaft for releasing the bottommost storage rod, wherein the width of the respective shaft is adapted to the rod width to ensure unimpeded successive movement of the storage rods located thereabove, wherein the separation means are provided at least at one of the two end faces of the shaft (2) with retention devices (4, 5) which are arranged one above the other and can be moved into the interior of the shaft for successive operating positions, wherein in a first operating position the two retention devices (4, 5) project into the interior of the shaft and the bottommost storage rod (7) rests on the upper retention device (4), in a second operating position the upper retention device (4) is removed from the interior of the shaft and the bottommost storage rod (7) rests on the lower retention device (5), in a third operating position both the upper retention device (4) and the lower retention device (5) project into the interior of the shaft, and in a fourth operating position the lower retention device (5) is removed form the interior of the shaft to release the bottommost storage rod.

2. The magazine of claim 1, wherein the third operating position of the upper retention device (4) projects into at least one cavity which is formed between the bottommost storage rod (7) and the storage rod (3) located thereabove.

3. The magazine of claim 2, wherein the respective shaft (2) is moved at least in the fourth operating position from a raised normal position into a lowered position.

4. The magazine of claim 3, wherein the respective shaft (2) is arranged in the lowered position in both the third and fourth operating positions.

5. The magazine of claim 4, wherein a conveying means (6) on which the storage rods (8) released from the respective shaft are arranged in consecutive order is provided under the at least one shaft (2).

6. The magazine of claim 5, wherein the conveying means (6) has loading points (9) in each of which one storage rod released form the associated shaft (2) is to be placed.

7. The magazine of claim 6, wherein the upper retention device (4) and the lower retention device (5) each comprises at least one elongate retention element (10-15), particularly in the form of a bolt, which can be moved into the interior of the shaft.

8. The magazine of claim 7, wherein the respective retention element (10, 11) of the upper and lower retention device (4, 5) is centrally disposed in the end face of the shaft.

9. The magazine of claim 8, wherein the upper retention device (4) and the lower retention device (5) each comprises two retention elements (12-15).

10. The magazine of claim 9, wherein the upper and lower retention device (4, 5), which each comprise two retention elements (12-15), are configured for individual release of storage rods (3) with substantially square or circular cross-sections.

11. The magazine of claim 10, wherein a plurality of shafts (2) are arranged adjacent to one another.

12. The magazine of claim 11, wherein the operating positions of the retention devices (4, 5) occur simultaneously in the plurality of shafts (2).

13. The magazine of claim 12, wherein at the open top ends of the shafts (2) a bulk material area (20) is provided for feeding the storage rods (3) to the shafts (2).

14. The magazine of claim 13, wherein the shafts (2) are formed by protrusions (23) provided on the inner sides of the magazine end faces.

15. The magazine of claim 14, wherein bars (22) which laterally define the upper shaft openings and which extend between the two end faces of the magazine are arranged at the upper ends of the shafts (2).

16. The magazine of claim 15, wherein a control device (17) actuated by a computer-aided evaluation device is configured for simultaneous actuation of the upper and lower retention device (4, 5) in the respective shafts (2).

17. The magazine of claim 16, wherein the conveying means (6) is configured for simultaneous transportation of the storage rods (3) released form the plurality of shafts (2).

18. The magazine of claim 17, wherein a scanning device (24, 25, 26) is provided which detects the availability of empty loading points (9) on the conveying means (6) under the shafts (2).

19. The magazine of claim 18, wherein two scanning devices (25, 26) are provided which detect a starting position and an end position of the conveying means (6) during transportation of the released storage rods (8), said conveying means being configured as a pushing device (16).

20. The magazine of claim 8, wherein the upper and lower retention devices (4, 5), which each comprise one retention element (10, 11), are configured for individual release of storage rods (3) with a star-shaped cross-section, in particular a Y-shaped cross-section, and equally long profile arms, and with equal angular distances between said profile arms.

21. A method for supplying storage rods that are to be loaded with sausage-shaped products, in which the storage rods are transported from a standby position to be loaded with sausage-shaped products, wherein the storage rods are individually arranged one above the other in a plurality of vertical rod arrangements adjacent to one another in the direction of transportation, that the lowermost storage rods in each rod arrangement are individually released substantially simultaneously from the rod arrangements, and that the released, adjacently arranged storage rods are forwarded simultaneously in batches by conveying means for subsequent loading.

22. The method of claim 21, wherein the starting position of an empty conveying means under the vertical rod arrangements is detected, and bottommost storage rods are released into the conveying means.

23. The method of claim 22, wherein the starting position of the empty conveying means is scanned contactlessly.

24. The method of claim 23, wherein the released storage rods are transported with lateral gaps between them, or lying adjacent to one another, for subsequent loading.

25. The method of claim 24, wherein it is detected when a batch of storage rods being transported has exited a region under the vertical rod arrangements.

26. The method of claim 25, wherein a next positioning of the conveying means in the starting position under the vertical rod arrangements is detected for subsequent release of the bottommost storage rods.

27. The method of claim 23, wherein the starting position of the empty conveying means is optically scanned contactlessly.

\* \* \* \* \*

UNITED STATES PATENT AND TRADEMARK OFFICE
CERTIFICATE OF CORRECTION

PATENT NO. : 7,824,250 B2
APPLICATION NO. : 12/197016
DATED : November 2, 2010
INVENTOR(S) : Klaus Topfer Page 1 of 1

It is certified that error appears in the above-identified patent and that said Letters Patent is hereby corrected as shown below:

Column 6, Line 57, cancel the text beginning with "1. A magazine for storage rods" to and ending "the bottommost storage rod." in column 7, line 11, and insert the following claim:
--1. A magazine for storage rods for receiving sausage-shaped products, comprising one or a plurality of vertically extending shafts in which the storage rods are to be arranged one above the other, and a separation means at the bottom end of each respective shaft for releasing the bottommost storage rod, wherein the width of the respective shaft is adapted to the rod width to ensure unimpeded successive movement of the storage rods located thereabove, wherein the separation means are provided at least at one of the two end faces of the shaft (2) with retention devices (4, 5) which are arranged one above the other and can be moved into the interior of the shaft for successive operating positions, wherein in a first operating position the two retention devices (4, 5) project into the interior of the shaft and the bottommost storage rod (7) rests on the upper retention device (4), in a second operating position the upper retention device (4) is removed from the interior of the shaft and the bottommost storage rod (7) rests on the lower retention device (5), in a third operating position both the upper retention device (4) and the lower retention device (5) project into the interior of the shaft, and in a fourth operating position the lower retention device (5) is removed from the interior of the shaft to release the bottommost storage rod.--

Column 7, Line 28, cancel the text beginning with "6. The magazine of claim 5" to and ending "shaft (2) is to be placed." in column 7, line 30, and insert the following claim:
--6. The magazine of claim 5, wherein the conveying means (6) has loading points (9) in each of which one storage rod released from the associated shaft (2) is to be placed.--

Column 8, Line 9, cancel the text beginning with "17. The magazine of claim 16" to and ending "the plurality of shafts (2)." in column 8, line 11, and insert the following claim:
--17. The magazine of claim 16, wherein the conveying means (6) is configured for simultaneous transportation of the storage rods (3) released from the plurality of shafts (2).--

Signed and Sealed this
Twenty-third Day of August, 2011

David J. Kappos
*Director of the United States Patent and Trademark Office*